United States Patent
Mohan et al.

(10) Patent No.: US 7,924,725 B2
(45) Date of Patent: Apr. 12, 2011

(54) ETHERNET OAM PERFORMANCE MANAGEMENT

(75) Inventors: Dinesh Mohan, Kanata (CA); Marc Holness, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 819 days.

(21) Appl. No.: 10/881,296

(22) Filed: Jun. 30, 2004

(65) Prior Publication Data

US 2005/0099952 A1 May 12, 2005

Related U.S. Application Data

(60) Provisional application No. 60/518,910, filed on Nov. 10, 2003, provisional application No. 60/518,920, filed on Nov. 10, 2003, provisional application No. 60/518,919, filed on Nov. 10, 2003, provisional application No. 60/518,912, filed on Nov. 10, 2003, provisional application No. 60/535,018, filed on Jan. 7, 2004.

(51) Int. Cl.
*G01R 31/08* (2006.01)
(52) U.S. Cl. .................. 370/236.2; 370/241.1
(58) Field of Classification Search .................. 370/229, 370/252, 242.1, 231, 232
See application file for complete search history.

(56) References Cited

U.S. PATENT DOCUMENTS

| | | | |
|---|---|---|---|
| 6,097,699 A | 8/2000 | Chen et al. | |
| 6,538,997 B1 | 3/2003 | Wang et al. | |
| 6,650,646 B1 | 11/2003 | Zywicki et al. | |
| 6,831,890 B1* | 12/2004 | Goldsack et al. | 370/229 |
| 6,907,006 B1* | 6/2005 | Sakamoto et al. | 370/236.2 |
| 7,177,325 B2* | 2/2007 | Claseman | 370/469 |
| 2004/0133368 A1 | 7/2004 | Johansson et al. | |
| 2004/0160895 A1 | 8/2004 | Holmgren et al. | |
| 2004/0165595 A1 | 8/2004 | Holmgren et al. | |
| 2004/0184407 A1 | 9/2004 | Pok et al. | |
| 2004/0230885 A1 | 11/2004 | Newcombe et al. | |

OTHER PUBLICATIONS

G. Malkin et al., Traceroute Using an IP Option, Internet Engineering Task Force (IETF) Request for Comments (RFC) 1393, Jan. 1993.

* cited by examiner

*Primary Examiner* — Kevin C Harper
*Assistant Examiner* — Henry Baron
(74) *Attorney, Agent, or Firm* — Anderson Gorecki & Manaras LLP

(57) ABSTRACT

Maintenance entities may be defined between customer or provider flow points for performance management on an Ethernet network. The maintenance entities may be defined for access link, intra-domain, and inter-domain, and may be defined on a link or service basis. The maintenance entities may be used to monitor performance within a network or across networks, and may be used to monitor various performance parameters, such as frame loss, frame delay, frame delay variation, availability, errored frame seconds, service status, frame throughput, the number of frames transmitted, received or dropped, the status of a loopback interface and/or the amount of time a service has been unavailable. Several management mechanisms may be used, and the measurements may be collected using a solicited collection method, in which a responses are required and collected, or an unsolicited collection method in which a response is not required.

21 Claims, 5 Drawing Sheets

ETHERNET OAM PERFORMANCE MANAGEMENT

CROSS REFERENCE TO RELATED APPLICATIONS

This application claims the benefit of and priority from the following five Provisional U.S. Patent Applications: 60/518,910, filed Nov. 10, 2003, entitled "Proposal for OAM Domain," 60/518,920, filed Nov. 10, 2003, entitled "Proposal For Connectivity Check Function For Fault Management In Ethernet OAM," 60/518,919, filed Nov. 10, 2003, entitled "Proposal For Non-Intrusive Loopback For Fault Management In Ethernet OAM," 60/518,912, filed Nov. 10, 2003, entitled "Proposal For Path Trace Function For Fault Management In Ethernet Networks," and 60/535,018, filed Jan. 7, 2004, entitled "Ethernet OAM: Performance Management." The content of each of these five applications is hereby incorporated herein by reference.

BACKGROUND OF THE INVENTION

1. Field of the Invention

The present invention relates to communication networks and, more particularly, to Ethernet Operation Administration and Maintenance (OAM) domains and an Ethernet OAM frame format.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Ethernet is a well known networking protocol that has been defined by the Institute of Electrical and Electronics Engineers (IEEE) as standard 802. Conventionally, Ethernet has been used to implement networks in enterprises such as businesses and campuses, and other technologies have been used to transport network traffic over longer distances. Specifically, network providers such as carriers were reluctant to deploy networks based on Ethernet technology, since Ethernet is designed to provide best efforts service and doesn't support Operation, Administration, and Maintenance (OAM) functions desired by the network providers. Since network providers need to be able to guarantee connectivity, Ethernet was felt to be inappropriate for deployment in these types of networks. When two Ethernet networks were to be connected over a network provider's network, the Ethernet frames would be converted to protocol data units using a transport protocol such as ATM, and carried over the network using the carrier's transport protocol. The Ethernet frames would then be recovered at the other side of the network provider's network and passed onto the second Ethernet network.

As the underlying networks have evolved and more and more Ethernet networks are being connected together, it has become more desirable to transport Ethernet frames in native form over the network provider's networks. Unfortunately, although it may be possible to overcome the limitations associated with the best-efforts nature of the Ethernet technology, other aspects of the Ethernet protocol still remain to be solved. For example, Ethernet does not enable certain Operation, Administration, and Maintenance (OAM) operations to take place to manage and diagnose problems on the network. This lack of OAM support in Ethernet prevents the network provider from taking measurements to perform fault detection, isolation, confirmation, and many other operations that a network provider or subscriber may wish to be able to do on the network. As Ethernet has expanded beyond a single domain, the ability to detect and isolate a network fault becomes more difficult rendering it necessary to implement OAM across Ethernet domain boundaries.

SUMMARY OF THE INVENTION

Performance management may be provided in an Ethernet network by defining maintenance entities and measuring performance of the maintenance entities on the network. Maintenance entities may be defined between any two flow points on the network, for example between customer flow points, provider flow points, or both, and may include, for example, access link, intra-domain, and inter-domain maintenance entities. The maintenance entities may be defined on a link basis or service basis, and may be used to measure performance of various aspects of the Ethernet network. Maintenance entities may be used to monitor performance within a given provider's network, as well as across the provider's network so that performance can be measured end-to-end across a network. The invention is not limited to the use of these particular maintenance entities.

The maintenance entities may be used to monitor various performance parameters, such as frame loss, frame delay, frame delay variation, availability, errored frame seconds, service status, frame throughput, the number of frames transmitted, received or dropped, the status of a loopback interface, and the amount of time a service has been unavailable. Many other parameters may be measured as well. The invention is not limited to measurement of these particular performance parameters.

The performance parameters may be measured using one or more management mechanisms, such as by collecting statistics from the management plane of the network elements, using management plane managed objects, and through the use of OAM frames on the data path. Information to be used in these measurements may be collected using a solicited collection method, in which a response is required to an OAM request frame, or using an unsolicited collection method in which the network element simply collects OAM frames. The invention is not limited to these several methods or collection methods.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
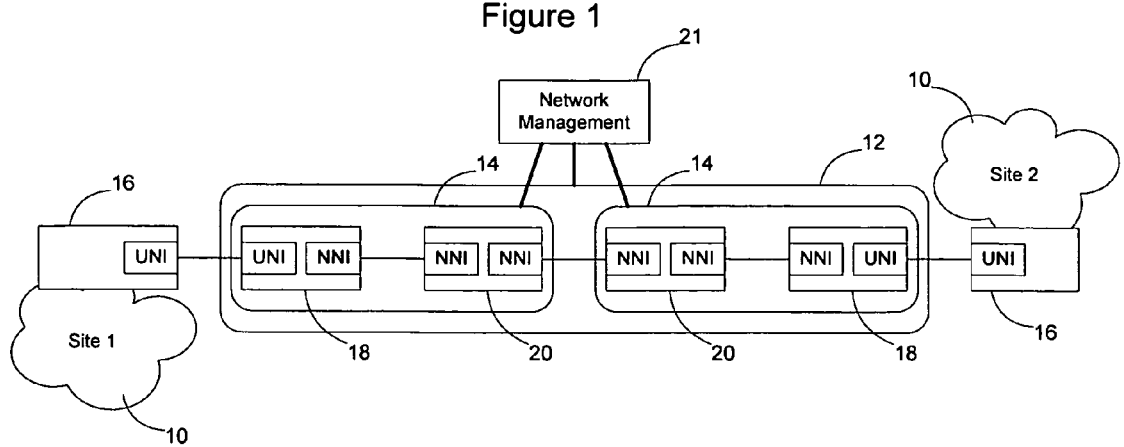
FIG. 1 is a functional block diagram of communication network.

FIG. 1 illustrates an example of a network topology in which customer sites 10 running a conventional protocol such as Ethernet are interconnected over a network 12. Multiple carriers 14 may participate in handling data flowing between the sites over the network, and each of the carrier networks may have multiple domains. Each customer site 10 is connected to the provider's 12 using a Customer Edge (CE) network element 16. Network elements within the provider's network that interface CE network elements will be referred to herein as Provider Edge (PE) network elements 18, and network elements within the provider's network that only interface other provider network elements and do not interface CE network elements will be referred to as Provider (P) network elements 20.

Interfaces on P, PE, and CE network elements may be configured to implement a protocol such as User to Network Interface (UNI), Network to Network Interface (NNI) or another protocol. These interfaces may serve as reference points in the network and can be managed using OAM flows.

Network management may be handled centrally, via one or more network management stations 21, or may be done on the network elements in a distributed fashion. In the embodiment illustrated in FIG. 1, a network management station 21 interfaces with the networks 10, 12, 14, to enable OAM operations to take place on the networks. Each network 10, 12, 14, may have its own network management station or they may connect to a common management station. The network management station may be connected to all network elements within a domain/network, or may be connected to select network elements, for example the edge network elements (PEs) 18. The invention is not limited to the embodiment illustrated in FIG. 1.

Figure 2:
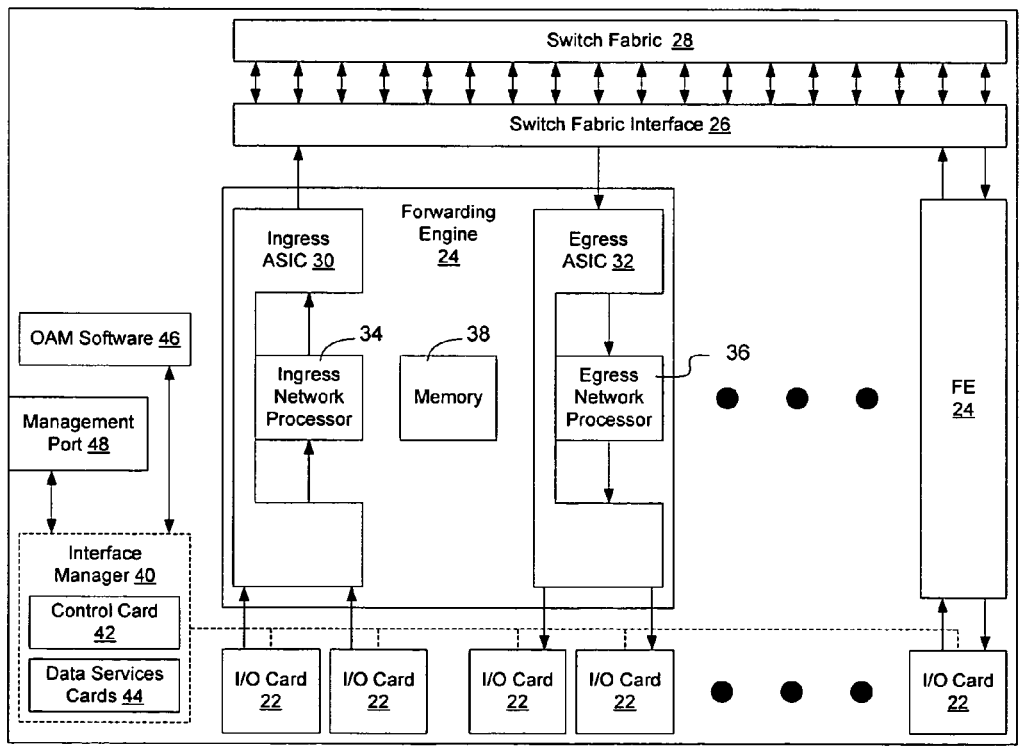
FIG. 2 is a functional block diagram of a network element according to an embodiment of the invention.

FIG. 2 illustrates one embodiment of a network element that may be configured to implement an embodiment of the invention. The network element may be used to implement one of the CE 16, PE 18, or P 20 network elements of FIG. 1. The invention is not limited to a network element configured as illustrated, however, as the invention may be implemented on a network element configured in many different ways. The discussion of the specific structure and methods of operation of the embodiment illustrated in FIG. 2 is intended only to provide one example of how the invention may be used and implemented in a particular instance. The invention more broadly may be used in connection with any network element configured to handle Ethernet frames in a communications network.

As shown in FIG. 2, the network element generally includes Input/Output (I/O) cards 22 configured to connect to links in the communications network. The I/O cards 22 may include physical interfaces, such as optical ports, electrical ports, wireless ports, infrared ports, or ports configured to communicate with other conventional physical media, as well as configurable logical elements capable of operating as MAC (layer 2) ports under the direction of an interface manager, described in greater detail below.

One or more forwarding engines 24 are provided in the network element to process frames received over the I/O cards 22. The forwarding engines 24 forward frames to a switch fabric interface 26, which passes the packets to a switch fabric 28. The switch fabric 28 enables a frame entering on a port on one or more I/O cards 22 to be output at one or more different ports in a conventional manner. A frame returning from the switch fabric 28 is received by one of the forwarding engines 24 and passed to one or more I/O cards 22. The frame may be handled by the same forwarding engine 24 on both the ingress and egress paths. Optionally, where more than one forwarding engine 24 is included in the network element 20, a given frame may be handled by different forwarding engines on the ingress and egress paths. The invention is not limited to any particular forwarding engine 24, switch fabric interface 26, or switch fabric 28, but rather may be implemented in any suitable network element configured to handle Ethernet frames on a network. One or more Application Specific Integrated Circuits (ASICs) 30, 32 and processors 34, 36 may be provided to implement instructions and processes on the forwarding engines 24. Optionally, a memory 38 may be included to store data and instructions for use by the forwarding engines.

An interface management system 40, optionally containing one or more control cards 42 and one or more data service cards 44, may be provided to create and manage interfaces on the network element. The interface management system may interact with an OAM module 46 locally instantiated on the network element or interfaced to the network element over a management interface port 48. The OAM module 46 may be implemented in software, firmware, hardware, or in any other manner as discussed in greater detail here.

As discussed in greater detail below, Ethernet OAM may allow network level OAM functions to be supported on the network, and may also allow service level Ethernet OAM functions to be supported on the network element. The following description will contain several sections. In the first section, a notion of Ethernet OAM domains will be introduced, and an OAM frame format will be introduced to support OAM operations within the domain (intra-domain) and between domains (inter-domain). The second section will describe how Ethernet OAM frames may be used to monitor performance for intra-domain and inter-domain flows. The third section will describe intra-domain and inter-domain fault detection and verification, and the fourth section will describe intra-domain and inter-domain fault isolation.

Part 1—Ethernet OAM Domains and Ethernet OAM Frame Format

Ethernet OAM domains and OAM flow identifiers are described in greater detail in Provisional U.S. Patent Application No. 60/518,910, filed Nov. 10, 2003, the content of which is hereby incorporated by reference. As discussed in greater detail below, OAM domains and OAM flow identifiers may be used to perform OAM functions in Ethernet domains by enabling network elements within the domains to filter OAM frames based on OAM domain and OAM flow identifier.

To enable network providers to use Ethernet technology in their carrier networks, Ethernet OAM should be able to operate within a domain (such as within a provider's domain), between domains (such as between domains owned by one provider or between domains owned by multiple providers), and should be able to take place in a point-to-point, a point-to-multipoint, a multipoint to point, or a multipoint to multipoint manner. The reason for these requirements, is that a given service for a subscriber may cross multiple domains owned and operated by multiple different parties. For example, a subscriber may have one office in a first city and another office in another city. The metropolitan carrier in each city may be different, and a third carrier may provide the long haul connectivity between the metropolitan areas. If Ethernet technology is to be used to support the transmissions end-to-end across the multiple carriers, OAM will need to be implemented within each domain and between domains.

Network elements placed at an administrative boundary of a provider's network serve as edge network elements for that provider network and handle the ingress and egress of network flows to/from the provider network. When an edge network element performs a hand-off of an Ethernet layer flow, to an edge network element of another provider, that network element serves as an edge hand-off network element. Not all edge network elements are edge hand-off network elements, as some edge network elements will not interface with other provider edge network elements. Those network elements that are not associated with the ingress, egress or hand-offs of network flows serve as interior network elements.

Additional administrative boundaries may exist within a single provider network to separate the provider network into domains. Network elements within the domain may similarly be classified as edge, edge hand-off, and interior network elements within each such administrative boundary.

OAM flows can be inserted and extracted at reference points within the network, namely at flow points and termination flow points. According to an embodiment of the invention, the following OAM flows may be defined:

Customer UNI-UNI flow between reference points on the customer side of the UNI.

Provider UNI-UNI flow between reference points on the provider side of the UNI

Segment OAM flows:

Between flow points on the boundary of a provider network;

Between flow points on the boundaries of two adjacent provider networks; and

Between any flow points as required;

Ethernet Physical Layer (ETY) link OAM flows.

Other OAM flows may be identified as well and the invention is not limited to the particular identified OAM flows.

Depending on the type of OAM flow, a provider may seek to limit the flow to maintain it within its administrative boundary. For example, the provider may wish to create segment OAM flows between flow points on a domain boundary that are not allowed to reach a customer network or another provider's network. Similarly, the network providers may wish to create segment OAM flows between flow points on boundaries of their provider networks that are not allowed to reach a customer's network or another provider's network. Therefore, an OAM service may be carried across a single or multiple OAM domains.

Ports on a network element in an OAM domain can be classified as interior or exterior to a particular OAM domain. Interior ports are those on which OAM frames, belonging to an OAM flow, are recognized and processed. Processing may result in either termination of the OAM flow or transmission of the OAM flow from one or more other ports on the network element. Ports not interior to a domain are exterior ports. An edge network element has both interior and exterior ports to an OAM domain, while an interior network element has all its ports marked as interior ports to that OAM domain.

Within an OAM domain, OAM flows may be applicable between edge network elements only (an edge hand-off network element is also an edge network element) or across all network elements (i.e. including all interior network elements and edge network elements).

OAM frames can be unicast or multicast frames. The difference between the two is based on the destination MAC address (DA). A unicast OAM frame has a unicast DA while a multicast OAM frame has the multicast bit set in the frame DA and thus has a multicast DA. A multicast OAM frame can associate itself to all edge networks elements or all network elements inside a domain, based on its multicast DA. According to an embodiment of the invention, the network elements support two types of OAM multicast DAs: all edge bridges multicast DA; and all bridges multicast DA. Other multicast DAs may be used as well, and the invention is not limited to an embodiment that supports only these two types of multicast DAs.

Different OAM flows can be identified by using OAM flow identifiers within the OAM frames. OAM flow identifiers can assume many values. Several examples of which are set forth below. The invention is not limited to these values, however:

UNI-UNI$_{Customer}$—a Customer UNI-UNI flow between reference points on the customer side of the UNI;

UNI-UNI$_{Provider}$—a Provider UNI-UNI flow between reference points on the provider side of the UNI;

Segment$_{intra-provider}$—a Segment OAM flow between flow points within the boundary of a provider network. This may include an OAM flow between flow points on the boundary of a provider network or between any flow points within a provider network as required.

Segment$_{inter-provider}$—a segment OAM flow between flow points inside the boundaries of two or more provider networks. This may include an OAM flow between flow points on the boundaries of two or more adjacent provider networks or between any flow points inside the boundaries of two or more provider networks, as required. Under special cases, the flow identifier Segment$_{inter-provider}$ may operate the same as the flow identifier UNI-UNI$_{Provider}$.

UNI$_{Segment}$—an OAM flow between reference points (i.e. Termination Flow Point (TFP and Flow Point (FP)) on the customer side and provider side of the UNI.

NNI$_{Segment}$—an OAM flow between flow points on two edge hand-off network elements connected to each other. Each edge hand-off network element belongs to a different provider network.

$UNI_{Link}$—If the UNI is realized using a single Ethernet Physical Layer (ETY) link, this OAM flow can be used for the ETY link between customer and provider networks.

$Transit_{Link}$—this OAM flow can be used for any intermediate ETY link between network elements.

Of these flow identifiers, $UNI_{Link}$ and $Transit_{Link}$ can be based on a proposed standard being discussed in the IEEE 802.3ah. The other flow identifiers may be defined as discussed in greater detail herein. Also, although multiple different OAM flows have been identified, not all will be applicable for all services and/or business models, particularly with multiple provider scenarios. Thus, the invention is not limited to an embodiment that supports all of these particular or only these particular listed flow identifiers.

A combination of the two types of OAM Multicast DA and the OAM Flow identifiers, as discussed above, can allow OAM flows to be created for multiple different maintenance entities. By filtering based on OAM flow identifiers, edge network elements can protect the domain from external sources of OAM frames, and ensure that OAM frames do not leak outside the domain.

Figure 3:
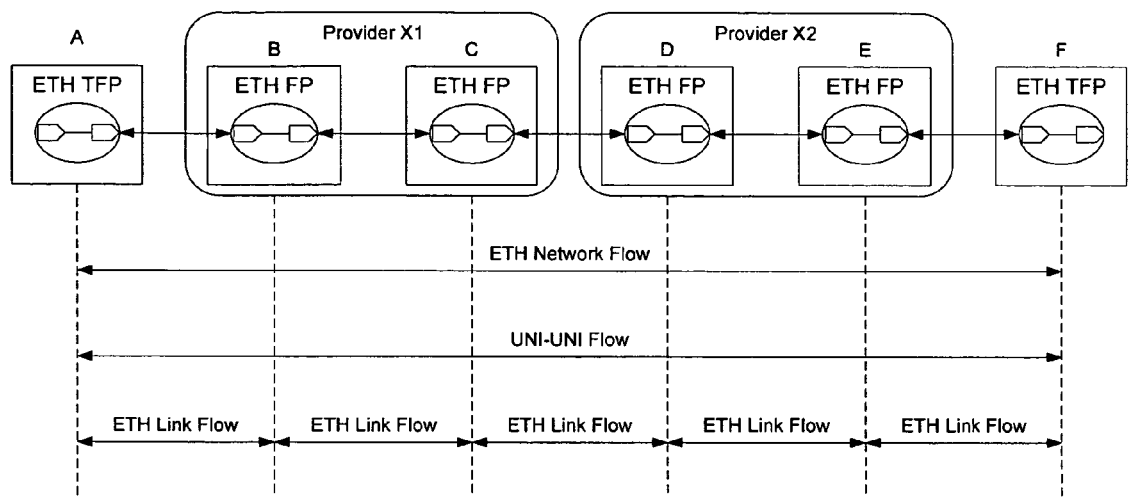
FIG. 3 is a functional block diagram illustrating flows on a network such as the communication network of FIG. 1.

FIG. 3 illustrates an example of a point-to-point flow reference model for an Ethernet layer network. In FIG. 3, network elements A and F are customer network elements, network elements B and C are edge network elements of provider X1 and network elements D and E are edge network element of provider X2. Network elements C and D are also edge hand-off network elements since they hand-off Ethernet OAM flows between the X1 and X2 domains. It will be assumed for the purposes of this example that there are other edge and interior network element in both provider X1 and provider X2 networks.

A provider UNI-UNI OAM flow can be generated at B (with a Unicast DA=MAC address on E) with OAM flow identifier (identifier=$UNI-UNI_{Provider}$). This OAM frame gets forwarded to E based on its Unicast DA.

When a similar provider UNI-UNI Multicast OAM flow is needed, it can be generated at B (with a multicast DA=all edge bridges multicast DA) with OAM flow identifier (identifier=$UNI-UNI_{Provider}$). As a result, all edge network elements within provider X1 OAM domain receive this OAM frame. When C receives this OAM frame, it recognizes it and processes it, as C is an edge network element. Since the OAM flow identifier=$UNI-UNI_{Provider}$, C also forwards the OAM frame to D. When D receives this frame, it recognizes it and processes it. D also forwards this frame to all other edge network elements within provider X2 OAM domain. When this OAM frame reaches E, it recognizes it and processes it. However, since the OAM frame is not meant to be sent to the customer network, E terminates the OAM frame.

If a segment multicast OAM flow is needed within the edge devices of provider X1 network, it can be generated at B (with a multicast DA=all edge bridges multicast DA) with OAM flow identifier (identifier=$Segment_{intra-provider}$). As a result, all edge network elements within provider X1 OAM domain will receive this OAM frame. When C receives this OAM frame, it recognizes it and processes it, since C is an edge network element. Since identifier=$Segment_{intra-provider}$, C will terminate the OAM frame and will not forward the OAM frame to D.

If a segment multicast OAM flow is needed across all devices of provider X1 network, it can be generated at B (with a multicast DA=all bridges multicast DA) with OAM flow identifier (identifier=$Segment_{intra-provider}$). As a result, all network elements within provider X1 OAM domain receive this OAM frame. When C receives this OAM frame, it recognizes it and processes it. Since identifier=$Segment_{intra-provider}$, C terminates the OAM frame and does not forwards the OAM frame to D.

According to an embodiment of the invention, the value of the flow identifier may be compared using a simple algebraic comparison with a reference to determine whether the OAM frame should be passed or dropped. For example, in one embodiment, the value of the OAM flow identifiers can be set so that filtering can be done based on whether the OAM frame entering or exiting a domain has an OAM flow identifier value smaller than a minimum OAM flow identifier configured on the interior and/or exterior ports of the domain. For example, if the following octet values are assigned to OAM flow identifiers:

$UNI-UNI_{Customer}$=255 (0xFF);
$UNI-UNI_{Provider}$=253 (0xFD);
$Segment_{inter-provider}$=251 (0xFB);
$NNI_{Segment}$=249 (0xF9);
$UNI_{Segment}$=247 (0xF7);
$Segment_{intra-provider}$=245 (0xF5);
$UNI_{Link}$=243 (0xF3); and
$Transit_{Link}$=241 (0xF1).

If the following minimum OAM flow identifier values are configured across the different ports, NNI port=249 (0xF9), UNI port=247 (0xF7), and Interior port=245 (0xF5), then filtering at edge network elements can be achieved such that OAM frames with OAM Flow identifiers smaller than the minimum OAM flow identifier are not allowed into or out of the OAM domain. The invention is not limited to this embodiment, however, as other manners of filtering may be performed as well. For example, the network elements may be configured to look for particular values or ranges of values depending on the function of the network element or port and the manner in which the OAM flow identifiers are implemented. Thus, the invention is not limited to the particular examples set forth above.

Part 1B—Ethernet OAM Frame Format

To enable OAM frames to be handled by network elements in an Ethernet domain and between Ethernet domains, an Ethernet OAM frame format is defined, according to one embodiment of the invention, which can be applied to all Ethernet OAM messages. Ethernet OAM can be used for both facility OAM and service OAM, in which a service OAM flow is associated with a specific service instance, and a facility OAM flow is not associated with a specific service instance.

Figure 4:
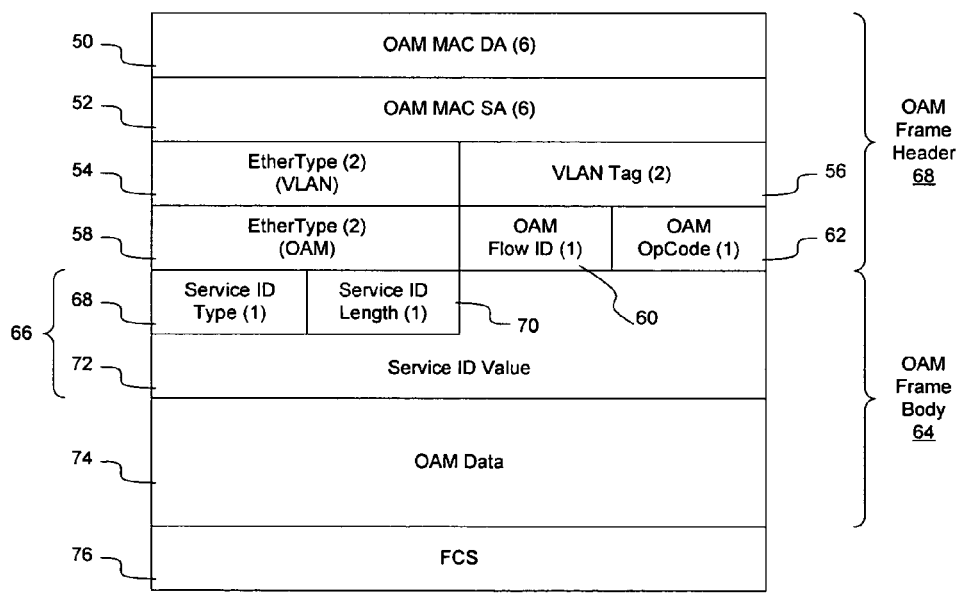
FIG. 4 is a functional block diagram of an Ethernet OAM format according to an embodiment of the invention.

Although OAM frames may be defined in a number of different ways, according to an embodiment of the invention, the OAM frame format may be arranged as illustrated in FIG. 4. The invention is not limited to this embodiment, however, as other frame formats may be used as well.

Ethernet OAM frames can be Unicast or Multicast, and this distinction is based on the frame's destination MAC address (DA). The OAM DA field 50 is a 6-Octet field that identifies the destination address of the OAM frame. The DA can be a unicast address of a specific bridge, or a multicast address corresponding to a group of bridges, such as a DA associated with an all edge bridges multicast address, or an all bridges multicast address. Other multicast addresses may be used as well. According to an embodiment of the invention, the Ethernet OAM frame format supports two types of multicast DAs: an all edge bridges multicast DA, and an all bridges multicast DA. The invention is not limited in this manner, however, as other forms of multicast DAs may be used as well.

The OAM MAC Source Address (SA) field 52 is a 6-Octet field that identifies the source address of the OAM frame. The Source Address (SA) can either be a unique address identifying the source bridge (a unique unicast MAC address assigned to the source bridge for OAM functionality) or can be the MAC address of a bridge port over which the OAM frame was sourced.

Ethernet OAM frames may be differentiated from data frames based on a pre-defined EtherType 54. The OAM EtherType may be defined in a number of ways, and the invention is not limited to a particular OAM EtherType definition. Multicast Ethernet OAM frames can also be differentiated based on either of the above two mentioned DAs.

An optional VLAN tag 56 may be used to identify a VLAN corresponding to the OAM message. When used, this VLAN tag may identify a service instance to which this OAM frame is associated, although the VLAN tag may also be used for other purposes as well.

The EtherType (VLAN) and VLAN Tag fields form a 4-octet field and are present when the OAM frame is associated with a service instance. In this case, this VLAN tag identifies the associated service instance.

The EtherType (OAM) 58 is a 2-octet field containing a unique EtherType value that identifies a frame as an OAM frame.

Different OAM flows can be identified by using an OAM Flow ID 60 within the OAM frame. The OAM Flow ID is a 1-octet field that identifies the OAM flow to which the OAM frame belongs. The OAM flow identifier is used to filter an OAM frame from entering or leaving an OAM domain. OAM flow identifiers are described in greater detail above, although the invention is not limited to these particular described flow identifiers as other flow identifiers may be used as well.

The OAM OpCode field 62 is a 1-Octet field that identifies the OAM function of the OAM frame. Several different OAM functions may be defined by the OpCode. For example, the OpCode may define OAM functions such as intrusive loopback, non-intrusive loopback, path trace, connectivity check, performance monitoring, Alarm Indicator Signals (AIS), Remote Defect Indicators (RDI), and vendor specific functions which may allow organizations to extend OAM functions in various proprietary ways. Several of these OAM functions will be discussed in greater detail below. Examples of the values that may be assigned to the OAM OpCode field include:

Intrusive Loopback Request (0x00);
Intrusive Loopback Release (0x01);
Intrusive Loopback Reply (0x02);
Non-Intrusive Loopback Request (0x03);
Non-Intrusive Loopback Reply (0x04);
Path Trace Request (0x05);
Path Trace Response (0x06);
Connectivity Check (0x07);
Performance Monitoring Request (0x08);
Performance Monitoring Reply (0x09);
Alarm Indicator Signals (AIS), (0x0A);
Remote Defect Indicators (RDI) (0x0B); and
Vendor Specific (0xFF)—The vendor specific op-code is provided to allow vendors or other organizations to extend OAM functions in proprietary ways.

Other OpCode field values may be assigned as well and the invention is not limited to an embodiment using these particular described OpCode values.

The OAM frame body is associated with the corresponding OAM OpCode. Based on the information required for the corresponding OAM function, identified using the OAM OpCode, a specific format of the OAM body can be specified.

An optional Service ID 66 TLV (type 68, length 70, value 72) may be used in the body of an OAM frame, when this frame is associated with a Service OAM. Use of a Service ID TLV, in addition to the optional VLAN tag 56 in the OAM frame header 68, provides another way to identify the service, other than the VLAN tag 56. This may be used, for example, to accommodate hierarchal VLANs, enable the OAM frames to carry unique global service IDs, and to enable other functions to be implemented using the OAM frames.

Additionally, use of a service ID TLV 66, in addition to the optional VLAN tag 56 in the OAM frame header 68, enables the service ID to be the same as the optional VLAN tag in the OAM header, thus allowing validation of OAM frames. Additionally, the service ID allows the service to be differentiated in the network from other services to enable particular OAM features to be provided per-service in the network. The service ID Type-Length-Value (TLV) field is a variable length field which is optional, and is present when the OAM frame is associated with a service instance, in which case the TLV portion identifies the associated service instance. Although the service ID has been illustrated herein as a TLV field in the Ethernet OAM frame body, the invention is not limited in this manner as the service ID may take other forms and be located at other locations in the Ethernet OAM frame, such as in the frame header.

The OAM data field 74 is a variable length field that is associated with the corresponding OAM OpCode and is specified for each OAM function. Since Ethernet OAM frames will be forwarded on the network using standard Ethernet forwarding techniques, an OAM frame including an OAM data portion must result in an Ethernet frame with a valid length as set forth in the IEEE 802 Ethernet standard. Therefore, if necessary, the OAM frame may be padded with zeros or other information/data to achieve a valid minimum frame size.

The frame check sequence (FCS) field 76 is a four byte field that carries the cyclic redundancy check (CRC) bits for the frame in a conventional manner.

As discussed above, using the notion of OAM domains it is possible to specify the manner in which OAM flows are handled and propagate on the Ethernet network. The OAM frame format, described above, contains fields to enable the frame to operate within the OAM domains and allow the network elements deployed in the network to handle the OAM frames in the intended manner. Other OAM frame formats may be developed as well, and the invention is not limited to this illustrated embodiment.

Part 2—Ethernet OAM Performance Management

A method and apparatus for using OAM in an Ethernet network for performance management is described in greater detail in Provisional U.S. Patent Application No. 60/535,018, filed Jan. 7, 2004, the content of which is hereby incorporated by reference.

When subscribing to an Ethernet service, measurement of service performance becomes a requirement for service providers and optionally its customers, since such measurements can be applied towards evaluating adherence to Service Level Agreements (SLA) between the provider and customer. The performance parameters that need to be measured and mechanisms used for these measurements can be discussed in terms of the maintenance entities (MEs) and information elements that need to be supported as part of the Ethernet OAM environment. According to an embodiment of the invention, a method and apparatus for defining these parameters and information elements is provided along with a method and apparatus for measuring service performance in an Ethernet network. Additionally, the use of currently available management objects for performance management across Ethernet networks is provided.

Maintenance Entities

Figure 5:
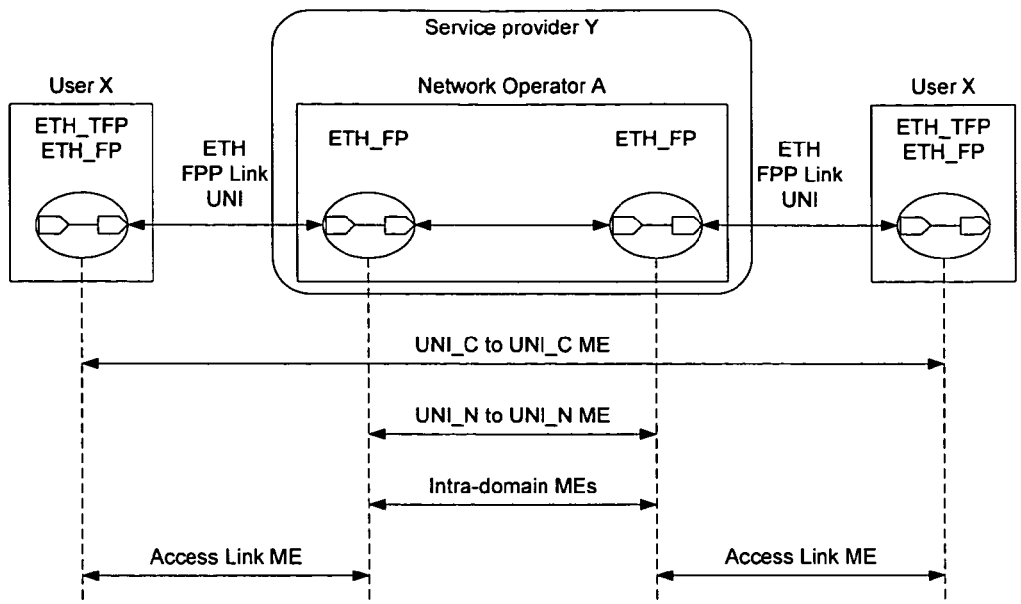
FIGS. 5 and 6 are a functional block diagrams of networks illustrating point-to-point Ethernet OAM flows according to an embodiment of the invention.
Figure 6:
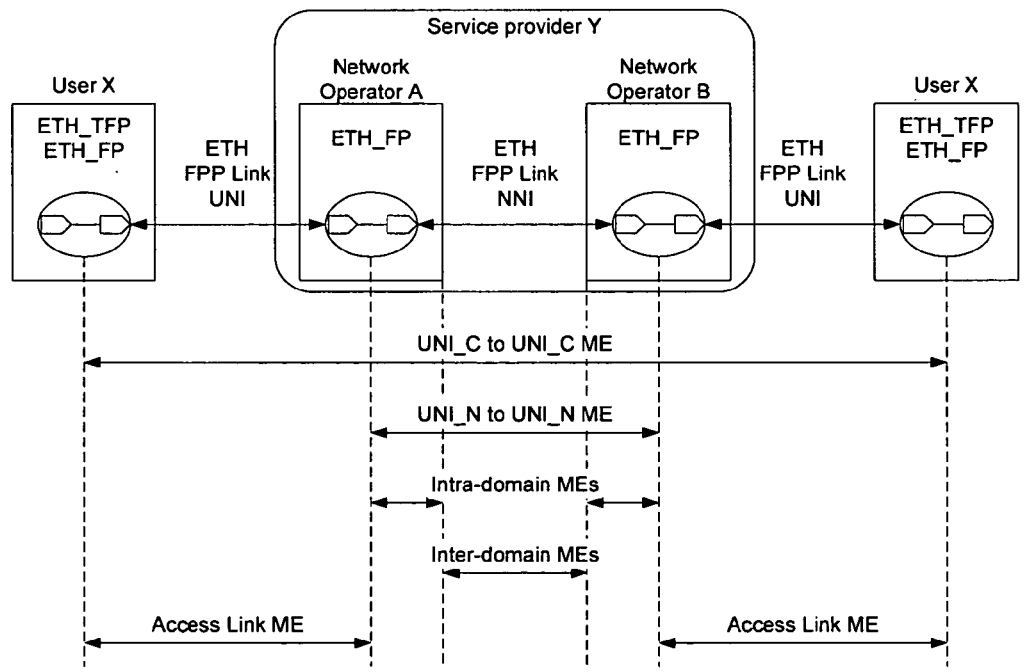
Figure 7:
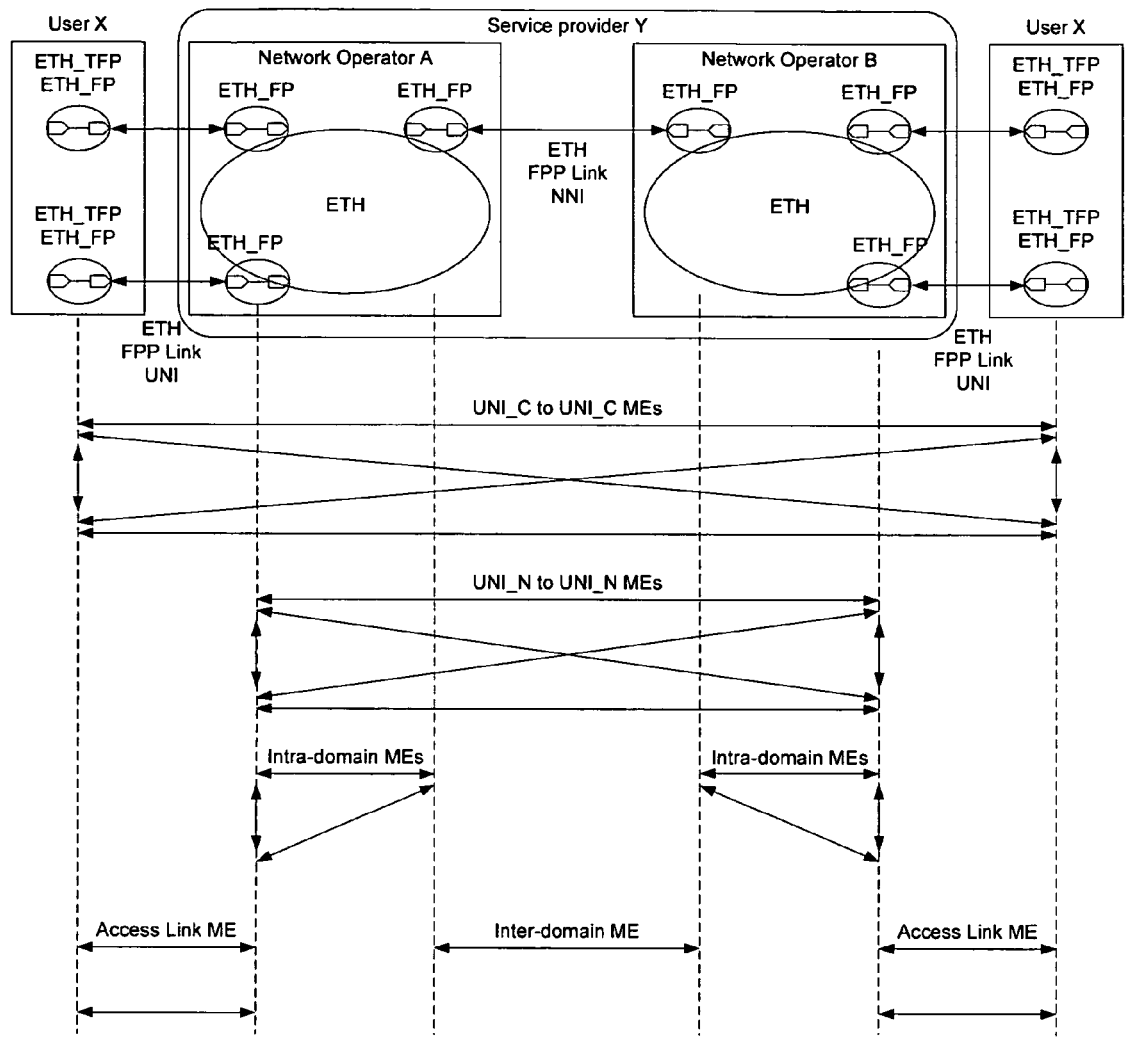
FIG. 7 is a functional block diagram of a network illustrating multipoint-to-point and point-to-multipoint Ethernet OAM flows according to an embodiment of the invention.

G.8010 provides point-to-point connectivity service types for both single operator and multi-operator scenarios. FIGS. 5 and 6 illustrate point-to-point Ethernet connectivity administrative domains associated with management entities, and FIG. 7 illustrates multipoint Ethernet connectivity administrative domains associated with management entities.

For point-to-point service types as illustrated in FIGS. 5 and 6, several maintenance entities are of particular interest. These maintenance entities include a maintenance entity between the customer flow points (UNI_C to UNI_C), a maintenance entity between network provider flow points (UNI_N to UNI_N), access link maintenance entities, intra-domain maintenance entities, and inter-domain maintenance entities, although other maintenance entities may be created and monitored as well. When the UNI is service multiplexed across more than one service instance, performance management on a link level basis is not feasible and must be done on a service level basis.

FIG. 5 illustrates an embodiment in which a single network operator provides service to connect User X's sites across a service provider's network. FIG. 6 illustrates an embodiment in which more than one network operator provides connectivity to implement service provider Y's network. In the embodiment illustrated in FIG. 5, to monitor connectivity between user X's sites, the user can use a UNI_C to UNI_C maintenance entity. This will allow end-to-end performance monitoring across the network.

Other aspects of the connection may be monitored as well. For example, it may be desirable to monitor the access links that connect the user X's sites to the service provider. Access link maintenance entities may be used for this. It may also be desirable to monitor flows through network operator A's network to monitor the performance within the network. This many be performed, as illustrated, through the use of intra-domain maintenance entities or with an UNI_N to UNI_N maintenance entity.

Where more than one network operator is used to provide connectivity in the service provider's network, each network operator will need to monitor performance within their own network as well as allow the service provider to monitor performance across the entire network. Thus, a UNI_N to UNI_N maintenance entity may be used to monitor performance across the service provider's network, an inter-domain maintenance entity may be used to monitor performance between two network operators, and intra-domain maintenance entities may be used by each of the network operators to monitor their own networks.

When multipoint flows are to be monitored, as shown in FIG. 7, additional maintenance entities of each type may be defined. For example, where the user has multiple flow points on each site, maintenance entities may be created to monitor flows between each of the customer flow points. Similarly, an access link maintenance entity may be defined for each customer flow point, and UNI_N to UNI_N maintenance entities may be defined between each of the network flow points. Depending on the topology of the interconnectivity of the networks, a single Ethernet link NNI may be used or multiple links may be used. Multiple intra-domain maintenance entities and one or more inter-domain maintenance entities may be required as well.

All of the maintenance entities defined on the network may be used to monitor performance. The invention is not limited to the particular illustrated maintenance entities as other maintenance entities may be defined as well.

Performance Parameters

Performance parameters for Ethernet networks may include several different parameters, and the invention is not limited to measurement of any particular group of parameters. Several parameters that may be measured include frame loss, frame delay, frame delay variation, and availability. While these parameters may be defined in different ways depending on the context, several possible uses for these parameters are set forth below. The invention is not limited to these particular parameters or to the manner in which these parameters are defined, as many different parameters may be created and used to manage the Ethernet domains.

One of the parameters that may be measured is a frame loss parameter, which may be measured as the difference between the number of service frames sent to an ingress UNI and the number of service frames received at an egress UNI. This may be applied to an Ethernet Virtual Connection (EVC), which corresponds to an UNI_N to UNI_N maintenance entity. In this context, for sub-rate or virtual services, the frame loss can be associated with both in-profile and out-of-profile service frames. In-profile service frames are those that are within the Committed Information Rate (CIR) for the particular service, and out-of-profile service frames are those that are transmitted in excess of the CIR for the service. Since the network elements on the network will typically handle in-profile traffic differently than out-of-profile traffic, frame loss may be measured for both types of transmissions.

Another parameter that may be measured is the frame delay. The frame delay may be measured as a round-trip delay, which is the amount of time which elapses between transmission of the first bit of a frame by the source node and reception of the last bit of a loop backed frame by the same source node, when the loop back is performed by the frame's destination node. Other forms of delay may be measured as well, such as on-way delay, and the invention is thus not limited to measurement of round-trip delay.

Another parameter that may be measured is the frame delay variation, which may be measured as a measure of the variation in the frame arrival pattern belonging to the same class of service instances compared to the arrival pattern at the ingress of the management entity node.

The availability function is a measure of the time the maintenance entity (associating service UNIs) is in available state. It is specified as a ratio of the total time a maintenance entity is in an available state divided by the total service time, where the total service time is viewed as a number of time intervals, and the available state is viewed as an interval when the service meets the frame loss, frame delay, and frame delay variation bounds. An unavailable state is encountered when at least one of the frame loss, frame delay, and frame delay variation parameters exceed their bounds/thresholds during a time interval. These bounds/thresholds are determined by the class of service. It may be noted that the definition of availability can also be based on the definition contained in ITU standard Y.1711, or in a number of other different ways.

Several additional performance parameters that may be taken into consideration include errored frame seconds, service status, and frame throughput. Errored frame seconds is a parameter that indicates if an error (e.g., frame error due to a Frame Check Sequence (FCS) or 8B/10B coding violation) has occurred within the second. This does not take into consideration errors when frames are received error free but are not delivered. The service status parameter indicates if the service is in-service or out-of-service. In-service or out-of-service state can be based on the available state mentioned above, and is available for both UNI-C to UNI-C and UNI-N to UNI-N maintenance entities. The frame throughput is an indication of the number of frames and/or bytes transmitted to a network interface relative to the committed information rate. Several other parameters may be measured as well, such as:

Frame Tx—the number of frames transmitted out of the customer facing interface within the (previous) time interval (e.g. 1 second).

Frame Rx—the number of frames received from the customer facing interface within the (previous) time interval (e.g. 1 second).

Frame Drop—the number of frames dropped at the customer facing interface within the (previous) time interval (e.g. 1 second).

Loopback Status—this parameter indicates whether the customer facing interface is in an intrusive loopback state (potentially due to OAM interactions across access link maintenance entity).

Client Signal Fail—this parameter indicates the state of an access link maintenance entity.

Unavailable Time—indicates the number of time intervals (e.g. 1 second) when the service status is unavailable.

Other parameters may be measured as well and the invention is not limited to these several identified measurements.

Measurement Mechanisms

There are several different measurement mechanisms that may be used to make performance measurements, which may yield disparate measurements and exhibit different levels of accuracy. Several such mechanisms include management plane statistical methods, management plane managed object methods, and data path OAM frame methods.

The management plane statistical method uses OAM frames to estimate data path behavior. Such methods are the least accurate since they apply approximations to emulate data frames. The limitation lies in the fact that the behavior of actual data frames may be quite different due to different addressing, processing, transient congestion conditions etc. Also, error conditions in the networks typically happen in bursts, which are more likely to be underrepresented in a statistical model. Thus, the statistical methods are likely to represent different results not representative of actual traffic conditions, although statistical methods may be useful in particular contexts and the invention does not exclude the use of this measurement technique.

The management plane managed objects method uses OAM frames, which use data path managed objects to calculate performance parameters that are inserted and/or extracted via the management plane. These methods are fairly accurate since they use data path statistics to measure data path performance. Their limitation lies in the fact that since the insertion and extraction of these OAM frames is done via the management plane, in-flight frames need to be accounted for. On the egress side, in-flight frames refer to data frames sent in the time period between accessing the egress data path managed objects and actual transmission of an OAM frame relating to those objects. On the ingress side of an OAM frame, in-flight frames refer to data frames received between reception of an OAM frame and a subsequent access of the ingress data plane managed objects. However, this limitation can be addressed by averaging such measurements across multiple time intervals.

The data path OAM frames method uses OAM frames that use data path managed objects that are inserted and/or extracted via the data plane. This method tends to be the most accurate since it does not have the limitations associated with the in-flight frames described above with respect to the management plane managed objects technique. However, the current data path hardware/chips do not support the implementation of such methods, since this requires Ethernet data path processing to include automatic insertion and/or extraction of OAM frames with data plane managed object values. Moreover, it would also require changes in hardware/chips to allow ingress and egress filtering rules across OAM frames to protect service provider administrative domains from unintended OAM frames.

According to an embodiment of the invention, a measurement mechanism based on the use of management plane managed objects mechanism is used to measure network performance. One advantage of these mechanisms is that they require no changes in the existing hardware/chips of the installed base of network elements that ultimately will need to support the Ethernet OAM mechanisms described herein. Rather, such mechanisms only require changes to be made in the OAM client software to enable the Ethernet OAM performance measurement to be implemented. The invention is not limited to this embodiment, however, as one or more of the other described methods may be used as well.

In this method, measurement of a particular parameter may be accomplished via the collection of managed object information and calculation of performance parameter(s) from the collected managed object information. Each of these portions of the method will be described in greater detail below.

Performance Management Collection Method

Managed object information may be collected using general or specific methods. When a general method is used, it can be applied to collect information across different managed objects e.g. using type length values as information elements instead of specific information elements. However, when a specific method with specific information elements is used, a separate method is needed per managed object or per set of managed objects.

Similarly, it is possible to use either a solicited or an unsolicited collection method, in which a solicited method requires a response after an OAM request frame is sent, while an unsolicited method does not require a response to an OAM frame. Some current examples of solicited and unsolicited methods include loopback and continuity check, as described in greater detail herein, although the invention is not limited to these two examples.

A generic method similar to the variable request/response method used in IEEE 802.3ah may be used to send/receive data path managed object information. Further, according to an embodiment of the invention, both solicited and unsolicited methods may be used and optionally extended, as discussed in greater detail below. Note that this extension for performance management will require additional processing and therefore should not be used for the measurement of delay.

Frame Loss Measurement

Several maintenance entities may be defined to support frame loss measurements, including: service management entities for point-to-point service with dedicated UNIs; UNI_C to UNI_C; UNI_N to UNI_N; access link (UNI); inter-domain (NNI); network maintenance entities; intra-domain; inter-domain; and numerous other types of maintenance entities. The invention is not limited to the particular maintenance entities used to perform frame loss measurements.

Unsolicited Method

To calculate frame loss using an unsolicited method, when applied across a UNI_N to UNI_N management entity, an OAM frame is sent every N seconds (e.g. N=1) that includes an indication of the number of frames transmitted at the ingress service UNI. Upon receiving this OAM frame, the transmitted value is compared with a frames received value at the egress service UNI. Between two such consecutive OAM frames, the frame loss can be measured as Frame Loss=|CT2−CT1|−|CR2−CR1|, where CT and CR are the number of transmitted and received frame counts, and the absolute value indicators apply where the counters wrap. The invention is not limited to the use of this particular formula, however, as other manners of measuring the frame loss may be used as well. Consecutive messages help in reducing error introduced by in-flight frames and any lack of timing synchronization between sender and receiver. Within a measurement time interval, the frame loss count can be averaged to improve the accuracy of this measurement.

Solicited Method

To calculate frame loss using a solicited method, the requestor sends an OAM request frame to a receiver every N seconds (e.g. N=1) with its managed objects information and expects an OAM response frame with receiver's managed object information. For example, when applied across an UNI_C to UNI_C maintenance entity, the requestor sends a frames transmitted value at an egress service UNI and requests a frames received value from the receiver's ingress service UNI. Similarly, when applied across an UNI_N to UNI_N maintenance entity, the requestor sends a frames received value at an ingress service UNI_N and requests the frames transmitted value from receiver's egress service UNI_N.

Upon receiving the OAM request frame, the receiver compares the received managed object information with its corresponding managed object information, and sends a response OAM frame back to the requester with the requested managed object information. When applied across an UNI_C to UNI_C maintenance entity, the receiver compares the received frames transmitted value with the frames received value and responds with its frames transmitted value. Similarly, when applied across an UNI_N to UNI_N maintenance entity, the receiver compares the received frames received value with its frames transmitted value and responds with its frames transmitted value.

Upon receiving an OAM response frame, the requestor compares the original sent value with the received values, in a manner similar to the receiver. It is possible that the receiver returns the results of frame loss instead of the managed object information in the response. However, if the managed object information is returned, the performance collection method remains generic.

Between two such consecutive OAM frames, the frame loss can be measured as Frame Loss=|CT2−CT1|−|CR2−CR1|, where CT and CR are the frames transmitted and frames received counts, and the absolute value indicators apply where the counters wrap. The invention is not limited to the use of this particular formula, however, as other manners of measuring the frame loss may be used as well. Consecutive messages help in reducing error introduced by in-flight frames and lack of timing synchronization between the sender and the receiver. Within a measurement time interval, the frame loss count can be averaged to improve the accuracy of this measurement.

Information elements that can be applied to the OAM data mentioned herein include the sequence number, the number of transmit TLVs (value filled in by requestor, recipient simply copies it back in response), the number of request TLVs (value is filled in by recipient and sent back in response), and the TLVs (Managed Object variable: FramesTransmittedOK & FramesReceivedOK, value length, value). The above method can be applied for measuring network level frame loss. The network level frame loss can be measured within the network, independent of the services.

For non-dedicated point-to-point service types with multiplexed service UNI, where a UNI carries more than one service flow, it is possible to measure the frame loss when the data path managed objects per service instance are supported.

Statistical Method

For a multipoint-to-multipoint service type, the statistical method across a pair of UNIs can be applied to estimate frame loss. For example, the requester may send a number (N) of OAM request frames to a recipient and may receive a different number (M) response frames back from the recipient such that M ←N. The data path frame loss can be estimated as Frame Loss=(N−M) per measurement time interval. As noted earlier, statistical methods are less accurate than the solicited and unsolicited methods, but the invention is not limited to use of one of the solicited or unsolicited methods described above.

Frame Delay Measurement

Frame delay measurement may be performed for point-to-point and multipoint-to-multipoint between a given pair of UNIs. Service maintenance entities across which frame delay can be measured include UNI_C to UNI_C and UNI_N to UNI_N. Frame delay measurements may be performed using a solicited method such as loopback, an unsolicited method such as connectivity check, or another method.

The loopback method measures round-trip or two-way frame delay. In this method, the requester sends an OAM request message with its timestamp to the receiver. The receiver replies, copying the requestor's timestamp. At the requester, the difference between the timestamps at the time of receiving the OAM response frame and original timestamp in the OAM response frame results in round trip frame delay. The frame delay method may support several information elements, including sequence number and request timestamp. The invention is not limited to use of either of these OAM data fields.

Frame Delay Variation Measurement

The frame delay variation may be measured for point-to-point and multipoint-to-multipoint flows between a given pair of UNIs. The maintenance entities across which the frame delay variation can be measured include UNI_C to UNI_C and UNI_N to UNI_N. A solicited method, such as a loopback method, may be used. The loopback method measures the round-trip or two-way frame delay per request and response frame. Within the period of observation, the requestor keeps track of maximum frame delay ($FD_{max}$) and minimum frame delay ($FD_{min}$). The frame delay variation is then calculated as: frame delay variation or jitter=$FD_{max}$−$FD_{min}$. Information elements that may be used in connection with the frame delay variation include the sequence number and the request timestamp, although other elements may be included as well.

Additionally, one-way Frame Delay Variation (FDM) may be measured, for example at the receiver the frame delay variation may be measured as FDV=[Time(rx2)−Time (rx1)]−[Time(tx2)−Time (tx1)], to provide the one-way delay variation between the two samples. This does not require time synchronization between requestor and responder. The invention is not limited to this particular example as other measurements may be made as well.

Availability Measurement

Availability measurements may be performed for point-to-point services with at least dedicated UNIs. Service maintenance entities across which availability may be measured include UNI_C to UNI_C and UNI_N to UNI_N. Availability may be measured using one of the frame loss, frame delay, or frame delay variation methods described above. Since the availability time period may be different than the measurement time period, the availability time interval (e.g. 24 hr) can be divided into measurement time intervals (e.g. 1 minute). The frame loss, frame delay, and frame delay variation measurements are measured per measurement time interval. If any of the three measures crosses its corresponding thresholds, which are dependent on the service type, the measurement time interval is considered to be unavailable; otherwise it is considered to be available. The availability may be calculated as: Availability=(# of available measurement time intervals)/(# of total measurement time intervals)×100%. Other details may be specified to define the availability as well, and other metrics may be developed to measure the availability, and the invention is not limited to this particular metric.

Other Measurements

A number of other measurements may be made as well. In the unsolicited method described above, these measurements may be made by sending OAM frames containing the information every time interval (e.g. 1 second) to the peer.

Available Management Objects

Some existing management objects that can be used for the mechanisms mentioned above include management objects specified in the following standards, although the invention is not limited in this manner as other management objects may be used as well:

IEEE 802.3-2002
    aFramesTransmittedOK
    aFramesReceivedOK
    IEEE 802.1Q-2003
    Frames Received
    Frames Outbound
    RFC 3635—Ethernet-like interface MIB (Obsoletes 2665)
    IF-MIB
    IfOutUCastPkts
    IfOutMulticastPkts
    IfOutBroadcastPkts
    IfInUCastPkts
    IfInMulticastPkts
    ifInBroadcastPkts
    aFramesTransmittedOK=ifOutUCastPkts+ifOutMulticastPkts+ifOutBroadcastPkts
    aFramesReceivedOK=ifInUCastPkts+ifInMulticastPkts+ifInBroadcastPkts
    RFC 2674—VLAN Bridge MIB
    dot1qPortVlanStatisticsTable
    dot1qTpVlanPortInFrames
    dot1qTpVlanPortOutFrames Part 3—Fault Detection And Verification A method and apparatus for using OAM in an Ethernet network to perform fault detection is described in two Provisional U.S. Patent Applications: No. 60/518,920, filed Nov. 10, 2003, and No. 60/518,919, filed Nov. 10, 2003. The content of each of these provisional applications is hereby incorporated herein by reference.

Part 3A—Fault Detection

Ethernet connectivity check can be applied to detect connectivity or continuity failures across a given pair of network elements. As used herein, the term "connectivity" will be used to include the notion of "continuity" as these phrases maybe used interchangeably by a person of ordinary skill in the art. Connectivity failures could result due to hard or soft failures, with software failure, memory corruption, or misconfigurations being several examples of soft failures. When used in context of a specific service instance, connectivity check can be applied to detect connectivity failures across a given pair of network elements that support that common service instance. Although connectivity checks can be used to detect connectivity failures across any pair of network elements, it is particularly useful across a pair of edge network elements.

To detect connectivity failures with either a given set of network elements or all network elements meeting certain condition(s) within a boundary, a network element sends connectivity check frames to either a specific unicast DAs or to a multicast DA. Condition(s) associated with the frame could be that all edge network elements should receive this connectivity check or all edge network elements participating in a service instance should receive this connectivity check. Upon reception of the first connectivity check from a particular network element, the receiving network element identifies connectivity with sending network element and expects to receive further periodic connectivity checks. Once the receiving network element stops receiving periodic connectivity checks from the sending network element, it detects that connectivity to the sending network element is broken. Following detection of connectivity failure, the detecting network element may notify the operator or initiate fault verification, followed by an optional fault isolation step.

A connectivity check may be initiated either on-demand via an operator initiated action or may be performed periodically. The periodicity at which connectivity checks are performed may be configurable, although a default value such as a 10 second interval may also be established. Optionally, to prevent a dropped connectivity check frame from causing an unwarranted connectivity failure determination, a connectivity failure may require a larger number of sequential frame losses, such as three consecutive connectivity check losses.

Since the OAM connectivity check mechanism has a periodicity interval greater than 50 ms, it may not be suitable to detect and trigger a sub-50 ms failure detection and restoration operation. Accordingly, a supplemental detection mechanism such as an Alarm Indication Signal/Remote Defect Indication (AIS/RDI) may be used in conjunction with physical failure detection for sub-50 ms detection.

The receiving network element does not need to respond to a connectivity check. The use of multicast DA results in only O(n) messages, where n is number of network elements requiring connectivity failure detection among each other. In comparison, connectivity checks with unicast DA results in $O(n^2)$ messages. When used between edge network elements, the multicast DA can be equal to "All Edge Bridges Multicast DA," which makes the connectivity check transparent to the interior network elements.

Figure 8:
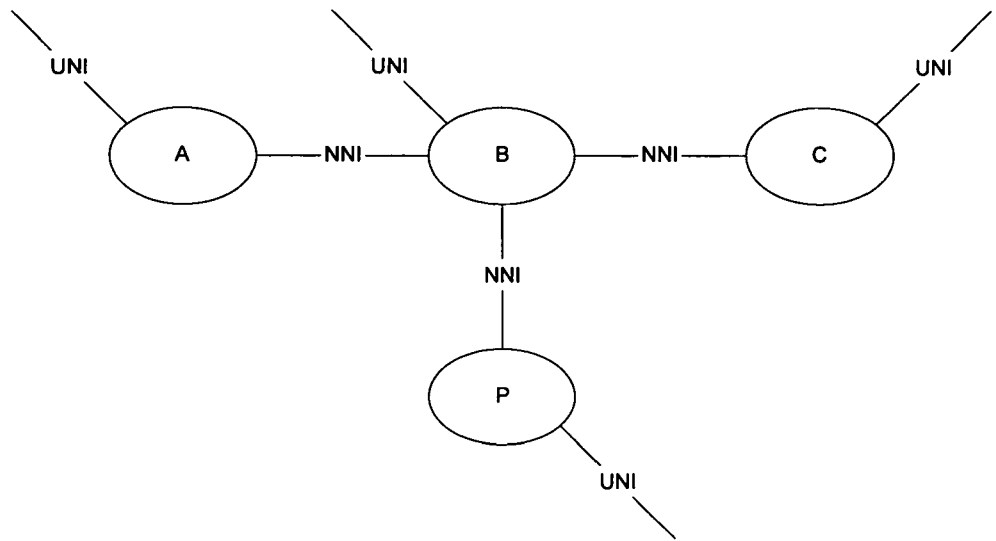
FIG. 8 is a functional block diagram of a network illustrating signaling connections between the nodes on the network.

When used in context of a service instance, interior network elements which do not have any UNI for the service instance propagate connectivity checks to other network elements. Similarly, the connectivity check is blocked from going out on the UNI ports towards the customer. A connectivity check is processed by network elements that have a UNI for the service instance. It is possible that a network element may have a UNI for that service instance and also serve as an intermediate network element while connecting to other edge network elements, as shown by network element B in FIG. 8. Specifically, in FIG. 8, the network element B has a UNI interface as well as NNI interfaces connected to another edge network elements A, C, P which have UNI interfaces. In this case, the connectivity check is processed by this network element, while it is also propagated to other network elements.

Since the connectivity check relies on the existence of a frame rather than the content of the frame to indicate the presence of connectivity, the OAM data field of the generic frame format (described above) may be empty. Optionally, additional information may be conveyed in the connectivity check frames, and the invention is not limited to a particular implementation.

For example, assume that a network element is scheduled to be removed from service, or otherwise is about to become unable to participate in connectivity checks. Optionally, the network element may include its anticipated state in the data field of the connectivity check frames to convey this information to other network elements on the network. For example, if a network element is put out of commission, then to avoid triggering false failure detection, the out-of-commissioned network element may be configured to indicate its soon to be out-of-state status to other member network elements through a flag in the connectivity message. The other member network elements, upon receiving this indication, may deactivate a corresponding a heartbeat timer for that network element.

In the example illustrated in FIG. 3, assuming that A and F are customer network elements. B and C are edge network elements of provider X1 and D and E are edge network element of provider X2. Both C and D are also edge hand-off network elements. Also assume there are other edge and interior network element in both provider X1 and provider X2 networks. A connectivity check can be generated at B (with a Unicast DA=MAC address on E) with OAM flow identifier (identifier=$Segment_{inter-provider}$). This OAM frame will be forwarded to E based on its Unicast DA.

Alternatively, a connectivity check can be generated at B (with a Multicast DA=All Edge bridges Multicast DA) with OAM flow identifier (identifier=$Segment_{inter-provider}$). As a result, all edge network elements within the provider X1 OAM domain will receive this connectivity check. When C receives this OAM frame, it will recognize it and processes it, as C is an edge network element. Since the OAM frame identifier=$Segment_{inter-provider}$, C will also forward the connectivity check frame to D. When D receives this frame, it will recognize it and processes it. D will also forward the frame to all other edge network elements within the provider X2 OAM domain. When this connectivity check frame reaches E, network element # will recognize the OAM Frame and processes it. However, since the OAM frame is not meant to be sent to the customer's network, network element E will terminate the connectivity check frame.

In another example, when a segment multicast OAM flow is needed within edge devices of provider X1 network, it can be generated at B (with a Multicast DA=All Edge bridges Multicast DA) with an OAM flow identifier (identifier=$Segment_{intra-provider}$). As a result, all edge network elements within the provider X1 OAM domain will receive this connectivity check. When C receives the connectivity check, it will recognize it and processes it, as C is an edge network element. Since the OAM flow identifier=$Segment_{intra-provider}$, network element C will terminate the connectivity check and will not forward it to network element D.

Part 3B—Fault Verification

Once a fault is identified, it may be advantageous to verify the fault before taking corrective action or in connection with taking corrective action on the network. One way to do this, as described in greater detail below, is through the use of OAM loopback on the network.

Loopback causes a network element receiving a frame from a network element to transmit a corresponding frame back to the original network element. Loopback functions may be implemented on a network in two ways—using an intrusive loopback or using non-intrusive loopback. Intrusive loopback is used to place a remote network element in a continuous loopback such that all received frames would be looped back except OAM frames. Since this function results in loopback of data frames, the data path is impacted. Since the datapath is affected, this loopback mode is considered to be intrusive. Given the nature of this mode, it is expected to be used mainly for point-to-point functions. Intrusive loopback OAM frames, requesting start or termination of loopback, are expected to be unicast (with DA=address of remote network element). Moreover, the applicability of intrusive loopback is expected to be limited to Ethernet Private Line (EPL) services, although the invention is not limited in this manner. Intrusive loopback generally may be used for out-of-service testing or for other types of testing.

Non-intrusive loopback is used mainly to verify connectivity with remote network element(s) and may be used in both unicast and multicast scenarios. Non-intrusive loopback is performed by sending OAM frames to remote network element(s) and expecting a response back which verifies connectivity. Since the data frames are not looped back, and the data path is therefore not impacted, this loopback mode is considered to be non-intrusive. As a result, this function can be used for in-service testing.

Although non-intrusive loopback may be initiated at any time, it is particularly useful when verifying connectivity once a connectivity failure is detected, for example using the connectivity check functions described above. Non-intrusive loopback requests may be generated by a network element either automatically following detection of connectivity failure, where detection could be done using a connectivity check function, or on-demand via operator initiated commands.

Non-intrusive loopback may also be used for fault detection when used on a periodic basis. However, since non-intrusive loopback requires a response for each request, non-intrusive loopback response generation, and the handling of the response by requestor, are more processing intensive tasks than connectivity check function described above, however.

Unicast Non-Intrusive Loopback

In a unicast non-intrusive loopback request an OAM frame is sent to a particular network element (with DA=unicast MAC address of destination network element). Upon receipt of this request OAM frame, the destination network element responds back with one or more non-intrusive loopback response OAM frame(s) (with DA=unicast MAC address of requesting network element, which was learned from the request OAM frame). Other network elements that receive this request and/or response OAM frame forward the request and response OAM frames without processing them since the OAM frame DAs do not match the MAC addresses of the forwarding network elements.

With unicast non-intrusive loopback there is no need to provide an identifier in the request to relate a response OAM frame with a corresponding request OAM frame. Specifically, the network element that generated the request frame to the particular DA may wait for a response frame having a SA that is the same as the DA of the request frame. Thus, by matching request message DA with the response message SA, it is possible to use the response message source address to correlate response and request messages.

To make the non-intrusive loopback function meaningful, the requester network element can maintain a timer to determine if a response OAM frame is received within an acceptable time period. When a response is not received within specified time period, the requester verifies connectivity failure. Following verification of connectivity failure, the verifying network element may notify the operator, and/or initiate an optional fault isolation step discussed below.

Although a unicast non-intrusive loopback can be used to verify connectivity failures across any pair of network elements, it is particularly useful across a pair of edge network elements. The invention is not limited in this manner, however.

Multicast Non-Intrusive Loopback

To perform multicast non-intrusive loopback, a multicast non-intrusive loopback request OAM frame is sent to all network elements meeting certain condition(s) within a boundary (with DA=Multicast DA). Several multicast DAs were discussed above in greater detail and may be used as the DA for the non-intrusive loopback frames. For example, the multicast request frame may be created so that all edge network elements should receive this request OAM frame or that all edge network elements participating in a service instance should receive this request OAM frame. Upon reception of a request OAM frame, the receiving network element(s) respond back with a unicast non-intrusive loopback response OAM frame (with DA=Unicast MAC address of requesting network element, which was learned from the request OAM frame). Other network elements that do not meet these conditions receive this request and/or response OAM frame and forward the frame without processing.

An identifier is not required to be included in the request to enable the requestor network element to relate a response OAM frame with a corresponding request OAM frame, although an identifier could optionally be used if desired. Where an identifier is used, the identifier may be used to detect the presence of loops on the network. Specifically, if the receiver receives an OAM frame with the same identifier, it may infer the presence of a loop on the network.

To enable the requestor to determine that a loopback has not occurred, the requester network element can maintain a timer to enable the requestor to wait a predetermined allowable period of time during which it may expect to receive response OAM frame(s). Based on all the responses received within the specified time period, the requester discovers peer network elements. Similarly, to prevent the requesting network element from getting overwhelmed with response OAM frames arriving at the same time, a bounded randomized delay may be used by the responding network element (s). This randomized delay may be implemented in the responding network elements, for example, to cause them to delay a short period before responding with a reply. The bounded randomized delay, according to one embodiment of the invention, is bounded by the timer period set by the requester to prevent the responses from being transmitted to the requester outside the reception period at the requestor.

Figure 9:
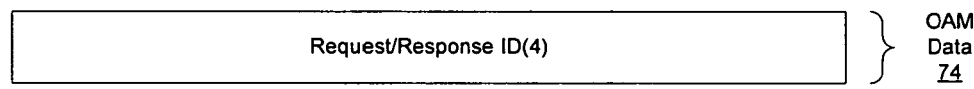
FIG. 9 is a functional block diagram of an OAM data field of a generic frame format according to an embodiment of the invention.

Although a multicast non-intrusive loopback request OAM frame can be used to discover all network elements within an administrative boundary (with DA=all bridges multicast DA), it may be used according to one embodiment of the invention to discover all edge network elements within the administrative boundary. To do this, the requester will send a multicast non-intrusive loopback request OAM frame (with DA=all edge bridges multicast DA). The format for the OAM data field of the generic frame format may assume the data structure illustrated in FIG. 9, although the invention is not limited to this embodiment. Specifically, as shown in FIG. 9, the OAM data field in this embodiment includes a request/response ID, 4 bytes in length, to enable responses to be identified and correlated to the request that was issued to identify the network elements in the administrative domain.

Referring back to the example discussed above and illustrated in FIG. 3, assume that network elements A and F are customer network element, network elements B and C are edge network elements of provider X1, and network elements D and E are edge network element of provider X2. It will also be assumed that both C and D are edge hand-off network elements, and that there are other edge and interior network elements in both provider X1 and provider X2 networks.

A unicast non-intrusive loopback request can be generated at B (with a Unicast DA=MAC address on E) with OAM flow identifier (identifier=$Segment_{inter-provider}$). This OAM frame gets forwarded to E based on its unicast DA. The request/response ID can be ignored in this case. Upon receiving the request, E sends a response back to B (with a unicast DA equal to the MAC address on B, which was learned from the request frame) with an OAM flow identifier (identifier=$Segment_{inter-provider}$).

Alternatively, a multicast non-intrusive loopback request can be generated at B (with a Multicast DA=all edge bridges multicast DA) with OAM flow identifier (identifier=$Segment_{inter-provider}$) and request/response ID (Id=XXX). As a result, all edge network elements within provider X1 OAM domain receive this request. When C receives this OAM frame, it recognizes it and processes it, as C is an edge network element. Since identifier=$Segment_{inter-provider}$, C also forwards this multicast non-intrusive loopback request to D. When D receives this request frame, it recognizes it and processes it. D also forwards this request frame to all other edge network elements within provider X2 OAM domain. When this request frame reaches E, it recognizes it and processes it. However, since the OAM frame is not meant to be sent to the customer network, E terminates this request frame. Upon receiving the request, each edge network element sends a response back to B (with a Unicast DA equal to the MAC address on B, which was learned from the request frame) with an OAM flow identifier (identifier=$Segment_{inter-provider}$) and Request/Response Id (Id=XXX). A pre-configured randomized delay may be applied before the response is sent back to prevent too many responses from arriving at B at the same time.

Considering another case, in which a segment multicast OAM flow is needed within edge devices of the provider X1 network. The OAM flow can be generated at B (with a multicast DA=all edge bridges multicast DA) with OAM flow identifier (identifier=$Segment_{intra-provider}$) and request/response ID (ID=XXX). As a result, all edge network elements within provider X1's OAM domain receive this request. When C receives request frame, it recognizes it and processes it, as C is an edge network element. Since the identifier=$Segment_{intra-provider}$, C terminates the request and does not forwards it to D. The response behavior remains the same. Upon receiving the request, each edge network element sends a response back to B (with a unicast DA equal to the MAC address on B, which was learned from the request frame), with an OAM flow identifier (identifier=$Segment_{inter-provider}$), and request/response ID (ID=XXX). A pre-configured randomized delay may be applied before response is sent back as described above.

Using fault detection and fault verification, as described above, Ethernet OAM flows may be able to be used to identify faults on the network and verify the existence of the fault. Although specific techniques have been described herein, the invention is not limited to only these several described embodiments, as the fault detection and verification techniques may be used in other ways on the network as well.

Part 3C—Auto-Discovery Method for Ethernet Networks

Ethernet network topography may be discovered using either the unsolicited or solicited methods described above. For example, by using the connectivity check method described above, with Ethernet OAM frames addressed to one of the defined multicast DAs, Ethernet connectivity check may be used to perform network topography auto-discovery. Specifically, a multicast OAM flow within provider X1 network may be generated at B (with a Multicast DA=All Edge bridges Multicast DA) with an OAM flow identifier (identifier=Segment$_{intra-provider}$). As a result, all edge network elements within the provider X1 OAM domain will receive this connectivity check. When C receives the connectivity check, it will recognize it and processes it, as C is an edge network element. Since the OAM flow identifier=Segment$_{intra-provider}$, network element C will terminate the connectivity check and will not forward it to network element D. By maintaining a table of network elements generating connectivity check frames, the network element can build a network topography map of the network.

Similarly, the loopback method (as described above) may be used to perform network topography discovery using a solicited auto-discovery method. For example, by generating multicast Ethernet OAM frames addressed to edge network elements, and collecting responses from those edge network elements, the a network topography may be built to show the edge network elements visible to the originating network element. Similarly, if the multicast DA is set to "all bridges multicast DA" the topography of the interior of the domain may be determined as well.

For example, a multicast non-intrusive loopback request can be generated at B (with a Multicast DA=all edge bridges multicast DA) with OAM flow identifier (identifier=Segment$_{inter-provider}$) and request/response ID (Id=XXX). As a result, all edge network elements within provider X1 OAM domain receive this request. When C receives this OAM frame, it recognizes it and processes it, as C is an edge network element. Since identifier= Segment$_{inter-provider}$, C also forwards this multicast non-intrusive loopback request to D. When D receives this request frame, it recognizes it and processes it. D also forwards this request frame to all other edge network elements within provider X2 OAM domain. When this request frame reaches E, it recognizes it and processes it. However, since the OAM frame is not meant to be sent to the customer network, E terminates this request frame. Upon receiving the request, each edge network element sends a response back to B (with a Unicast DA equal to the MAC address on B, which was learned from the request frame) with an OAM flow identifier (identifier= Segment$_{inter-provider}$) and Request/Response Id (Id=XXX). A pre-configured randomized delay may be applied before the response is sent back to prevent too many responses from arriving at B at the same time. By collecting the responses, the network topography may be determined by the network element. Where the interior of the network is of interest as well, the multicast DA may be set to all bridges multicast DA. A similar method may be used to determine the topography of a portion of the network, such as on a domain level, by setting the OAM flow identifier (identifier=Segment$_{intra-provider}$). The invention is not limited to these several examples, however, as other methods may be used as well to perform network topography discovery.

Part 4—Fault Isolation

Once a fault is detected and optionally verified, it may be helpful for the network administrator to be able to isolate the fault isolation. Isolation of the fault allows the network operator to locate where on the network the fault is occurring, and identify which network element requires attention to minimize service interruption associated with repairing the fault. The process of fault isolation will be discussed in greater detail below, and is also described in Provisional U.S. Patent Application No. 60/518,912, filed Nov. 10, 2003, the content of which is hereby incorporated herein by reference.

According to an embodiment of the invention, a path trace function is used to trace the path traversed by a data frame between a source network element and a destination network element. The path trace function can be used in two ways: to find a path through the network under non-failure conditions, and to identify the location of a failure under other conditions. Under multiple failure scenarios, where multiple failures occur within the failure detection time, the path trace function can serve to localize the first occurrence of the failure along the path. As discussed below, the path trace function will not traverse a failure and, hence, cannot be used to identify the location of additional failures behind the first failure. Optionally, the path trace function may be used from both sides of a failure to confirm a single failure on the path or to locate two failures on the path.

Although a path trace function may be initiated at any time, it is particularly useful when localizing failures once a connectivity failure has been detected and optionally verified. The path trace request may be generated by a network element either automatically following detection and verification of connectivity failure, where detection could be done using the connectivity check function and verification could be done using one of the loopback functions, such as the unicast non-intrusive loopback function, both of which are described above. Alternatively, the path trace may be performed on-demand via an operator initiated command.

A path trace request OAM frame is sent to all network elements meeting certain condition(s) within a boundary (with the OAM frame DA=Multicast DA). Condition(s) could be that all network elements having certain knowledge of a particular destination address should receive this request OAM frame within a single provider network, with all such receiving network elements needing to respond, or that all network elements having certain knowledge of a particular destination address should receive this request OAM frame within multiple provider networks, but that only edge network elements need to respond. Other knowledge conditions may be used as well, and the invention is not limited to the particular knowledge conditions described herein.

Upon reception of a request OAM frame, the receiving network element responds back with a unicast path trace response OAM frame (with DA=unicast MAC address of requesting network element, as learned from the request OAM frame) and also attempts to forward the path trace request OAM frame to the next possible hop toward the destination address associated with the knowledge condition.

Since a single OAM request frame can generate multiple responses back to the requester, it is desirable to include an identifier in the request to enable the requestor network element to correlate a response OAM frame with the corresponding request OAM frame that caused the response to be generated.

Since the requestor network element is expecting frames to be returned, the requestor network element may maintain a timer to enable it to wait a predetermined period during which it may expect to receive response OAM frame(s). Based on all the responses received within the specified time period, the requester can determine the path to the desired network element or determine where, on the network, the path stops en-route to the desired network element. As discussed above in connection with multicast loopback section, a bounded randomized delay may be used by the responding network element(s) to delay generation of a response message to thereby prevent the requesting network element from getting overwhelmed with response OAM frames arriving at the same time.

The request OAM frame may be sent to all network elements (with DA=All bridges multicast DA). If the path trace is used within a single provider network domain, which is expected to be the general case, the request OAM frame may use an OAM flow identifier (identifier=Segment$_{intra-provider}$). On the other hand, if the path trace is to be used across multiple provider networks, which is generally not applicable since providers do not normally offer visibility within their network domains, the request OAM frame may use an OAM flow identifier (identifier=Segment$_{inter-provider}$).

Figure 10:
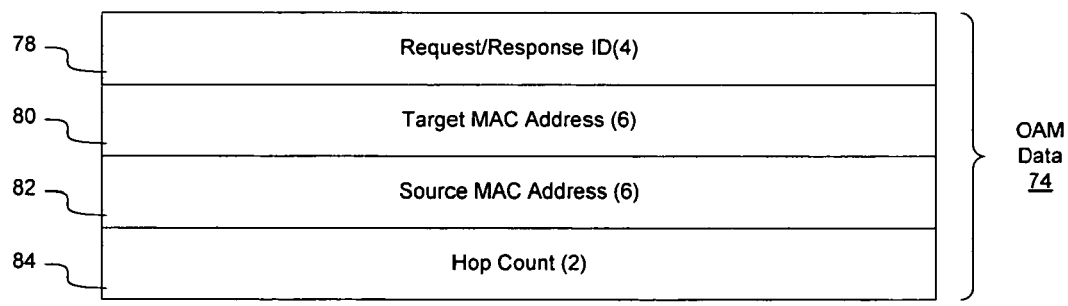
FIG. 10 is a functional block diagram of a path trace request message format according to an embodiment of the invention.

The path trace function may be used to determine a path to a particular network element, as well as to identify the location of a fault on a path to the network element. FIG. 10 illustrates a possible data structure for a data field 74 of the OAM frame format illustrated in FIG. 4 and described in greater detail above. This data field format may be used to implement the path trace function according to an embodiment of the invention, although the invention is not limited to an embodiment that implements this particular data structure.

As shown in FIG. 10, the OAM data field includes request response ID 78 that may be used to identify responses to the request. The destination network element is identified using a target MAC address field 80. Since intermediate receiving network elements may replicate the path trace request OAM frames, and thus the SA of packets used to perform the path trace will not necessarily have the same SA as the original request, identity regarding the original requesting network element is maintained in the source MAC address field 82 in the OAM data field. This allows the responding network elements to always send a response back to the original requesting network elements using response OAM frame (with DA=source MAC address).

The request OAM frame in this embodiment also contains a hop count field 84 to enable the requesting network element to correlate the distance of the responding network element from the requesting network element. The handling of this hop count field is described in greater detail below.

To handle intra-provider and inter-provider topology visibility concerns, as mentioned above, the receiving networks elements can process the frame as follows: If OAM flow identifier in the request is (identifier=Segment$_{intra-provider}$) and the network element has knowledge of the target MAC address, a response OAM frame is sent to the requesting network element. Also the receiving network element generates another path trace OAM request copying the target MAC address and source MAC address fields from the request OAM frame it had received and increments the hop count field. When the target MAC Address is the address on the receiving network element, it sends a response OAM frame and terminates the request OAM frame.

Alternatively, if the OAM flow identifier in the request is (identifier=Segment$_{inter-provider}$) and the network element has knowledge of the target MAC address and the network element is a edge network element, a response OAM frame is sent to the requesting network element. If the target MAC address is not an address on the receiving network element, it generates another path trace OAM request copying the target MAC address and source MAC address fields from the request OAM frame it had received and increments the hop count field. When the target MAC address is an address on the receiving network element, it sends a response OAM frame and terminates the request OAM frame.

Given that the path trace flow is different from that of a user data flow (since the path trace goes through the control plane of each hop; whereas, user data flow doesn't), there can exist rare situations where the failure cannot be detected by the path trace flow. Since the path trace can identify all the network elements along the traced path, it is possible to run loopback between the requesting node and the intermediate nodes to further isolate the connectivity failure in such rare situations.

Referring back to the example illustrated in FIG. 3, an inter-domain path trace request can be generated at B (with a multicast DA=all bridges multicast DA) with OAM flow identifier (identifier=Segment$_{inter-provider}$), request/response Id (Id=XXX), target MAC address (address=MAC address of E), source MAC address (address=MAC address of B) and hop count (count=1). As a result, all network elements within provider X1 OAM domain receive this request.

When C receives this OAM frame, it recognizes it and processes it, as it is an edge network element and has information on E's MAC address. C sends a response back to B (with a unicast DA=MAC address on B, as learned from the source MAC address) with OAM flow identifier (identifier=Segment$_{inter-provider}$), request/response Id (Id=XXX), and the same values of target MAC address, source MAC address and hop Count. Since the identifier=Segment$_{inter-provider}$, C also generates a similar path trace request to D with the same values from the request OAM frame it had received. However, the hop count is increment by 1 (hop count=2).

When D receives this request frame, it recognizes it and processes it. D also forwards this request frame to all other network elements within provider X2 OAM domain. When this request frame reaches E, it recognizes it and processes it, as E is an edge network element and contains E's MAC address. E sends a response back to B (with a unicast DA=MAC address on B, as learned from the source MAC address) with OAM flow identifier (identifier= Segment$_{inter-provider}$), request/response Id (Id=XXX), and same values of target MAC address, source MAC address and hop count. Since the frame is not meant to be sent to customer network, E terminates this request frame. In this scenario, if a network element receives the request OAM frame but is not an edge network element, it just forwards the received request OAM frame to other network elements downstream.

A segment path trace OAM flow may also be needed. In this event, an intra-domain path trace request can be generated at B (with a multicast DA=all bridges multicast DA), with OAM flow identifier (identifier=Segment$_{intra-provider}$), request/response Id (Id=XXX), target MAC Address (address=MAC address of C), source MAC address (address=MAC address of B), and hop count (count=1). As a result, all network elements within provider X1 OAM domain receive this request.

When C receives this OAM frame, it recognizes it and processes it, as it is a network element and contains the target MAC address. C sends a response back to B (with a unicast DA=MAC address on B, as learned from the source MAC address) with OAM flow identifier (identifier= Segment$_{intra-provider}$), request/response Id (Id=XXX), and same values of target MAC address, source MAC address and hop count. Since the identifier=Segment$_{intra-provider}$) C terminates the request and does not forward it to D.

Generally, MAC entry age-out timers are used to flush out any dormant MAC table entries. This age-out time period may impact the capability to perform a path trace, because the MAC address, corresponding to a target MAC address entry in the OAM frame, in the Forwarding Data Bases (FDB), may age out. This becomes an issue when a failure occurs, which is not recoverable by other mechanisms.

Thus, a path trace can be performed within two intervals: before the age out period, or after the age out interval. If the path trace is performed before the age out period expires, the path trace will return valid results. If path trace is performed after the age-out period expires, the path trace will be limited to the first network elements that have aged the MAC address out of their forwarding databases. It is possible that the path trace can be performed beyond the age out period by maintaining a view of the path at the edge network elements by performing periodic path trace during normal circumstances i.e. no fault conditions. Upon a failure in the network, the edge network element can use this path information to perform multiple unicast loopback where the DA for each consecutive unicast loopback request is the successive address contained in path information that is maintained at the edge network element. According to one embodiment of this invention, the periodicity of the periodic path trace is greater than the periodicity of the connectivity check.

The aspects of Ethernet OAM may be implemented in a number of different manners, including as software centrally instantiated in one or more management systems or as distributed code instantiated in the various network elements configured to implement the OAM functions. It should be understood that all functional statements made herein describing the functions to be performed by the methods of the invention may be performed by software programs implemented utilizing subroutines and other programming techniques known to those of ordinary skill in the art. Alternatively, the aspects of Ethernet OAM may be implemented in hardware, firmware, or a combination of hardware, software, and firmware. The invention is thus not limited to a particular implementation.

When the OAM functions are implemented in software, the software may be implemented as a set of program instructions configured to operate in control logic on a network element that are stored in a computer readable memory within the network element and executed on a microprocessor. For example, in the network element of FIG. 2, the OAM functions may be performed by OAM module 46 implemented as software and executed on a processor associated with the interface manager 40. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of monitoring performance on an Ethernet network, the Ethernet network having a plurality of network elements handling flows of data traffic on the Ethernet network, the method comprising the steps of:

defining maintenance entities between flow points on the Ethernet network, the flow points being located at any desired locations within the Ethernet network;

transmitting flows of Ethernet Operation, Administration, and Management (OAM) frames on the maintenance entities, the flows of Ethernet OAM frames being intermixed with the data traffic on the network between the flow points on the Ethernet network, each maintenance entity extending between at least two flow points such that a flow of Ethernet OAM frames will be inserted into a data path extending across the Ethernet network at one of the flow points associated with the maintenance entity, and extracted from the Ethernet network by at least a second of the flow points associated with the maintenance entity; and measuring network performance parameters from the flows of extracted Ethernet OAM frames, at least one of the measured network performance parameters being directly related to performance of data traffic on the data path between the flow points on the Ethernet network;

wherein the Ethernet OAM frames each have an Ethernet OAM frame header, the Ethernet OAM frame header including at least an Ethernet OAM MAC source address, an Ethernet OAM MAC destination address (DA), and an Ethernet OAM flow ID field; and wherein the Ethernet OAM flow ID field contains one of a plurality of values to enable network elements on the network to filter the Ethernet OAM frames so that the Ethernet OAM frames can be selectively transmitted or filtered at a network administrative boundary or at an OAM domain boundary.

2. The method of claim 1, wherein the flow points are customer flow points.

3. The method of claim 1, wherein the flow points are provider flow points.

4. The method of claim 1, wherein the flow points are customer and provider flow points.

5. The method of claim 1, wherein the flow points are on different provider networks.

6. The method of claim 1, wherein the flow points are on the same provider network.

7. The method of claim 1, wherein the maintenance entities comprise at least one of access link, intra-domain, and inter-domain maintenance entities.

8. The method of claim 1, wherein the performance parameter is at least one of frame loss, frame delay, and frame delay variation.

9. The method of claim 1, wherein the performance parameter is at least one of availability, errored frame seconds, service status, and the amount of time a service has been unavailable.

10. The method of claim 1, wherein the performance parameter is at least one of a frame throughput, a number of frames transmitted, the number of frames received, and a number of frames dropped.

11. The method of claim 1, wherein the step of measuring comprises collecting statistics from management planes of network elements on the network the statistics being compiled by the management planes in connection with the receipt of OAM frames on the maintenance entities.

12. The method of claim 1, wherein the step of measuring comprises collecting management plane managed objects from management planes of network elements on the network.

13. The method of claim 1, wherein the step of measuring comprises collecting information on the maintenance entity using a solicited collection method.

14. The method of claim 1, wherein the step of measuring comprises collecting information on the maintenance entity using an unsolicited collection method.

15. A method of collecting performance data on a maintenance entity defined on an Ethernet network, the Ethernet network having a plurality of network elements handling flows of data traffic on data paths extending between flow points on the Ethernet network, the method comprising the steps of:
  receiving, by a first of the network elements on the Ethernet network, a relatively constant flow of Ethernet OAM frames inserted into one of the flows of data traffic from a second network element on the Ethernet network, the first and second network elements defining the end points of the maintenance entity on the Ethernet network; and
  calculating, based on information obtained from the received Ethernet OAM frames, the performance data of the maintenance entity, the performance data of the maintenance entity being directly related to performance of data traffic on the data path between the end points of the maintenance entity on the Ethernet network;
  wherein the Ethernet OAM frames each have an Ethernet OAM frame header, the Ethernet OAM frame header including at least an Ethernet OAM MAC source address, an Ethernet OAM MAC destination address (DA), and an Ethernet OAM flow ID field; and
  wherein the Ethernet OAM flow ID field contains one of a plurality of values to enable network elements on the network to filter the Ethernet OAM frames so that the Ethernet OAM frames can be selectively transmitted or filtered at a network administrative boundary or at an OAM domain boundary.

16. The method of claim 15, wherein the step of calculating is further based on information associated with the first network element.

17. A method of collecting performance data on a maintenance entity defined on an Ethernet network, the method comprising the steps of:
  transmitting, by a first network element on the Ethernet network, a relatively constant flow of Ethernet OAM frames along with data frames associated with a flow of data traffic to be monitored on the Ethernet network, both the Ethernet OAM frames and the data frames being addressed to a second network element on the Ethernet network, the first and second network elements defining the end points of the maintenance entity on the Ethernet network; and
  receiving, from the second network element, at least one response OAM frame transmitted by the second network element onto the Ethernet network and addressed to the first network element in response to receipt of at least one of the Ethernet OAM frames from the flow of Ethernet OAM frames;
  wherein the Ethernet OAM frames each have an Ethernet OAM frame header, the Ethernet OAM frame header including at least an Ethernet OAM MAC source address, an Ethernet OAM MAC destination address (DA), and an Ethernet OAM flow ID field; and
  wherein the response contains managed object information, the method further comprising the step of comparing the response managed object information with corresponding managed object information.

18. The method of claim 17, wherein the Ethernet OAM flow ID field contains one of a plurality of values to enable network elements on the network to filter the Ethernet OAM frames so that the Ethernet OAM frames can be selectively transmitted or filtered at a network administrative boundary.

19. The method of claim 17, wherein the Ethernet OAM flow ID field contains one of a plurality of values to enable network elements on the network to filter the Ethernet OAM frames so that the Ethernet OAM frames can be selectively transmitted or filtered at an OAM domain boundary.

20. The method of claim 1, wherein the flows of Ethernet OAM frames are extracted from the Ethernet network by filtering to prevent further transmission of the flows of Ethernet OAM frames.

21. The method of claim 15, wherein the step of receiving comprises filtering to prevent further transmission of the flows of Ethernet OAM frames.

* * * * *